(12) United States Patent  (10) Patent No.: US 8,459,926 B2
Hedley et al.  (45) Date of Patent: Jun. 11, 2013

(54) ARTICLE HANDLING APPARATUS

(76) Inventors: Robert Ian Hedley, Milbrodale (AU);
David Peter White, Cessnock (AU);
Christopher Nash Whybin, Ferny Hills (AU)

( * ) Notice: Subject to any disclaimer, the term of this patent is extended or adjusted under 35 U.S.C. 154(b) by 15 days.

(21) Appl. No.: 13/273,821

(22) Filed: Oct. 14, 2011

(65) Prior Publication Data

US 2012/0034059 A1  Feb. 9, 2012

Related U.S. Application Data

(63) Continuation of application No. 12/362,076, filed on Jan. 29, 2009, now abandoned, which is a continuation of application No. 10/937,457, filed on Sep. 7, 2004, now abandoned.

(30) Foreign Application Priority Data

Sep. 4, 2003  (AU) ................................. 2003904805

(51) Int. Cl.
*B60B 29/00*  (2006.01)
(52) U.S. Cl.
USPC ........................................................ 414/429
(58) Field of Classification Search
USPC ........... 414/426, 427, 429, 911, 910; 180/209
See application file for complete search history.

(56) References Cited

U.S. PATENT DOCUMENTS

| | | | | |
|---|---|---|---|---|
| 2,364,918 A * | 12/1944 | Roberson | ...... | 414/427 |
| 2,379,587 A * | 7/1945 | Moore | ...... | 414/427 |
| 2,554,433 A * | 5/1951 | Warren | ...... | 294/198 |
| 3,830,387 A * | 8/1974 | Virnig | ...... | 414/427 |
| 3,858,735 A * | 1/1975 | Zrostlik | ...... | 414/427 |
| 3,927,778 A * | 12/1975 | Zrostlik | ...... | 414/429 |
| 4,042,139 A * | 8/1977 | Pernsteiner et al. | ...... | 414/427 |
| 4,051,966 A * | 10/1977 | Cotton | ...... | 414/428 |
| 4,894,103 A * | 1/1990 | Bailey | ...... | 156/111 |
| 5,110,067 A * | 5/1992 | Sinkkonen | ...... | 244/50 |
| 5,443,243 A * | 8/1995 | Hennes et al. | ...... | 254/93 R |
| 5,549,436 A * | 8/1996 | Fresia | ...... | 414/426 |
| 5,895,197 A * | 4/1999 | Mc Vaugh | ...... | 414/680 |
| 5,927,932 A * | 7/1999 | Seaberg | ...... | 414/620 |
| 5,954,160 A * | 9/1999 | Wells et al. | ...... | 187/219 |
| 7,677,582 B2 * | 3/2010 | Hedley et al. | ...... | 280/79.4 |
| 2002/0150453 A1 * | 10/2002 | Hedley et al. | ...... | 414/426 |
| 2010/0166531 A1 * | 7/2010 | Bauer et al. | ...... | 414/429 |

* cited by examiner

*Primary Examiner* — Joshua Rudawitz
(74) *Attorney, Agent, or Firm* — McAfee & Taft

(57) ABSTRACT

An article handling apparatus for gripping and moving an article such as a large tire or other vehicular component of a mining, earthmoving or like vehicle. The article handling apparatus includes a base frame for movement of the apparatus over a substrate surface, and a handling frame for gripping the article, such as a tire. The apparatus has a pair of moveable arm members on the base frame, and a pair of moveable arm members on the handling frame. The apparatus can be compactly stored by contraction of the arms, can be manipulated through tight spaces, and is extremely stable while handling large and heavy articles.

6 Claims, 9 Drawing Sheets

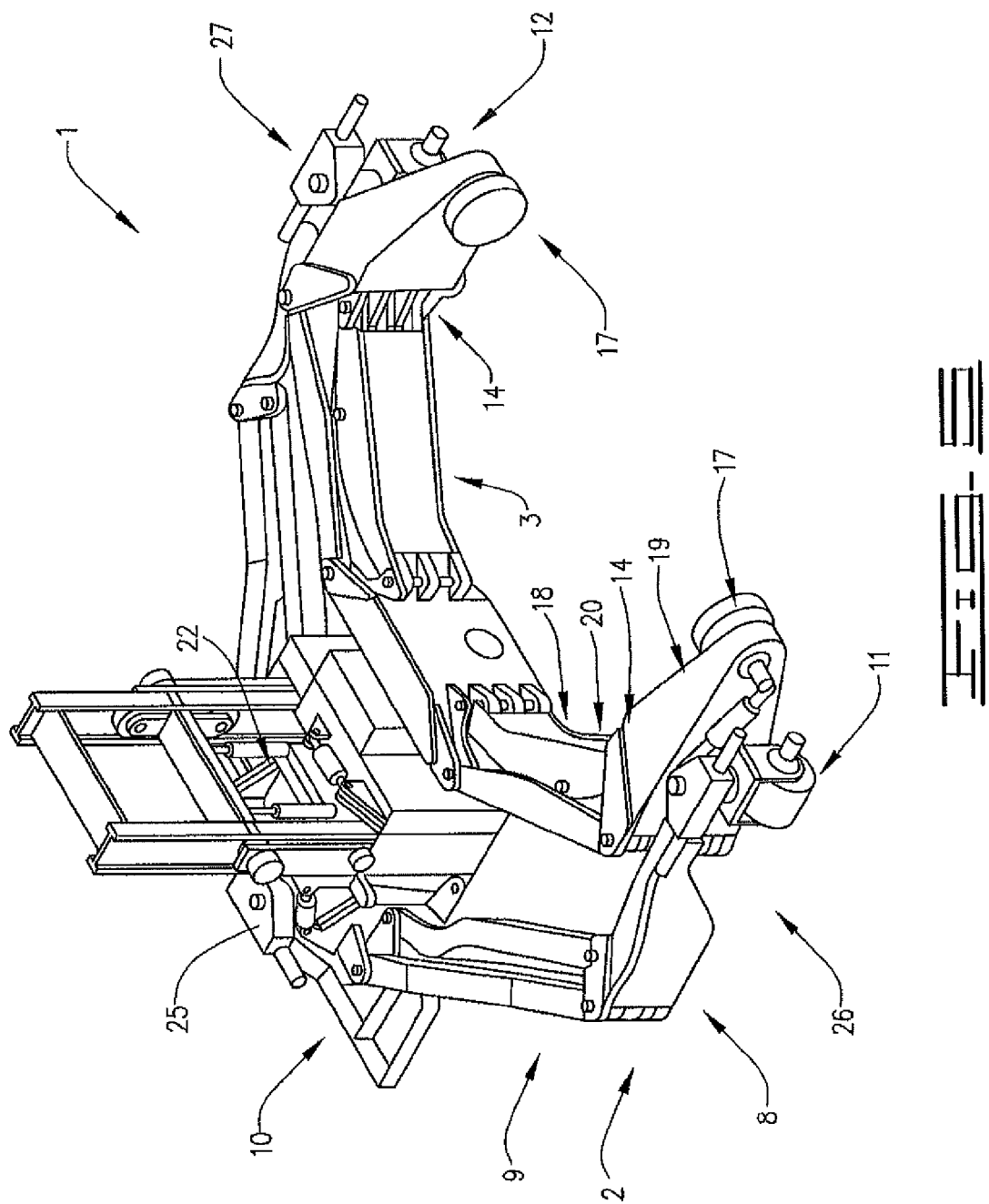

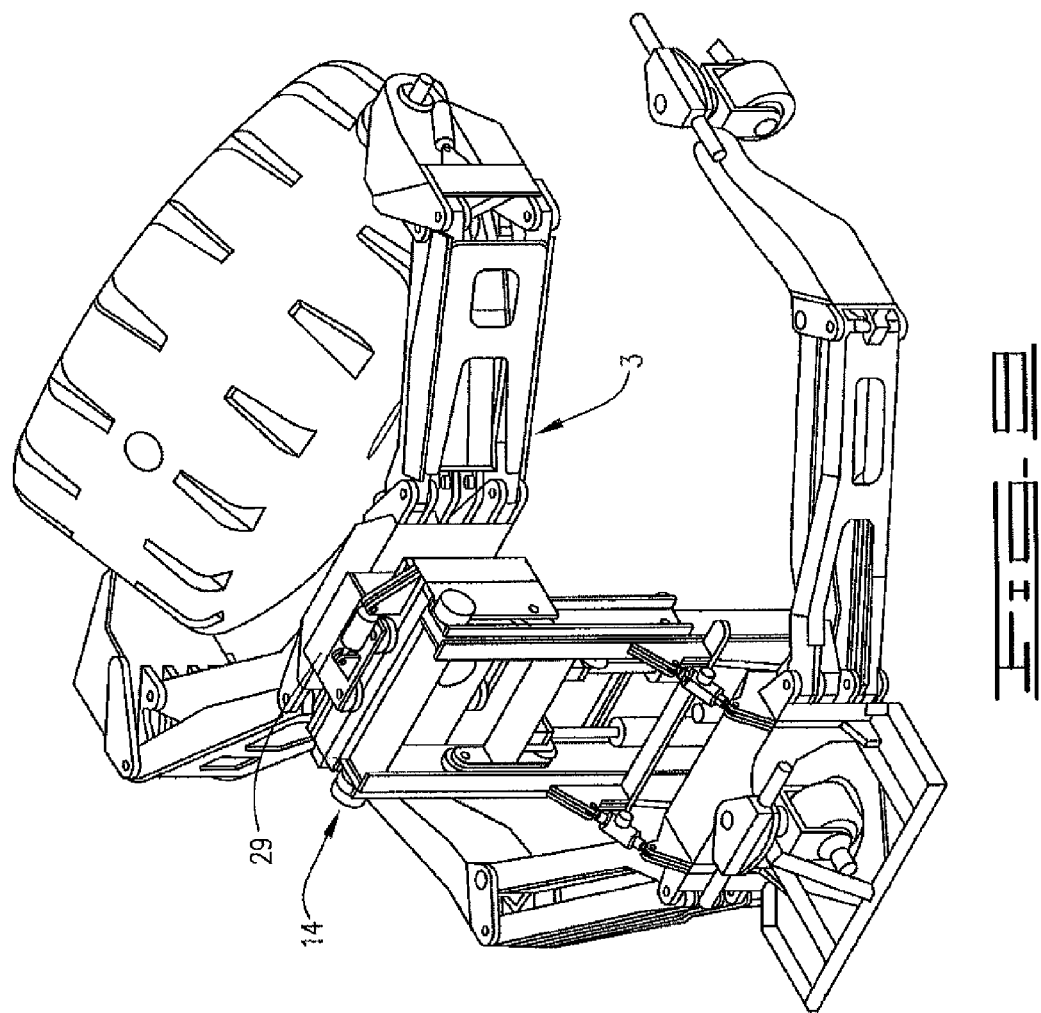

ARTICLE HANDLING APPARATUS

CROSS REFERENCE TO RELATED APPLICATION

This application is a continuation of U.S. patent application Ser. No. 12/362,076 entitled ARTICLE HANDLING APPARATUS, filed Jan. 29, 2009 now abandoned, which is a continuation of U.S. patent application Ser. No. 10/937,457 entitled ARTICLE HANDLING APPARATUS, filed Sep. 7, 2004 now abandoned.

BACKGROUND OF THE INVENTION

The present invention relates to an article handling apparatus, and in particular, to an apparatus which is useful for handling a tire, wheel, or other component of a vehicle, earthmoving or mining equipment. The present invention particularly relates to an article handling apparatus which is able to be compactly stored, and which, due to its innovative design is able to manipulate large articles, such as tires, and wheels of mining or earthmoving equipment, or where space restrictions often apply.

DESCRIPTION OF THE PRIOR ART

The reference to any prior art in the specification is not, and should not be taken as, an acknowledgement or any form of suggestion that the prior art forms part of the common general knowledge in Australia or overseas.

In mining and earthmoving operations, the vehicular equipment is extremely large. The servicing of such large equipment is cumbersome, due to the large size of the various components. Such equipment is often serviced on site, but at other times, is brought to a specialized workshop which is specially designed to cope with the large size of such equipment. Even when brought to a workshop, space limitations often exist, and it is sometimes awkward to remove certain components of the equipment for replacement or servicing. Components of earthmoving and mining equipment which are often difficult to manipulate include wheels and tires, particularly when in a workshop situation.

It has been known hereinbefore to adapt large scale vehicles with fork-lifts and the like thereon, with arms and gripping means to be able to grip and provide certain movement of the wheels and tires to be serviced. However, such vehicles which are used to manipulate the tires and wheels themselves have to be large scale, not only to cope of the dimension of the tires and wheels, but also to counter-balance the weight of the tires or wheels which are required to be manipulated.

SUMMARY OF THE INVENTION

The present invention seeks to overcome or at least ameliorate certain disadvantages of the prior art by providing a unique article handling apparatus.

The present invention seeks to provide an article handling apparatus which is able to appropriately handle articles which are large in size and awkward to manipulate, such as the wheels and tires of earthmoving or mining equipment vehicles.

The present invention also seeks to provide an article handling apparatus which, due to its unique design, is able to move articles in space restricted areas.

The present invention also seeks to provide an article handling apparatus which, due to its unique design, is able to be compactly stored.

In one broad form, the present invention provides an article handling apparatus, including: a base frame, movable over a substrate surface; and a handling frame supported on said base frame, having means for gripping and moving an article.

Preferably, said base frame includes a pair of movable arm members extending from a central body portion.

Also preferably, each of said base frame arms is articulated.

Preferably, said base frame includes wheels for movement over said substrate surface.

Also preferably, said base frame includes at least three wheels, one on the extremity of each arm, and one on said central body portion.

Preferably, movement of said arm members is effected by one or any combination of hydraulic cylinder, by electric motor or other activation means.

In a preferred embodiment, said handling frame includes a pair of arm members extending from a central body portion.

Preferably, said central body portion of said handling frame is either separate from or formed integrally with said central body portion of said base frame.

Also preferably, said handling frame is attached to said central body portion via a sliding mechanism.

Also preferably, each of said handling frame arms is articulated.

In a most preferred form, the extremity of each arm includes gripping means for gripping said article.

Preferably, said gripping means include a pair of plates whereby said article is gripped by being pressed between said plates.

Also preferably, said plates are movable about a universal joint to allow orientation of said plates depending upon the shape of said article, in any direction.

Most preferably, movement of said gripping means is effected by one or any combination of hydraulic cylinder, electric motor or other activation means.

In a preferred embodiment, movement of said arms is effected by one or any combination of hydraulic cylinder, electric motor or other actuation means.

Preferably, said central body portion of said handling frame is substantially vertically extendable to which said arms are attached to the upper end thereof.

Also preferably, extension/contraction of said central body portion is effected by one or any combination of hydraulic cylinder, electric motor or other actuation means.

Preferably, said handling frame is pivotally attached to said body portion, pivotal movement being effected by one or any combination of hydraulic cylinder, electric motor or other actuation means.

Most preferably, said handling frame is pivotally connected to said base frame, pivotal movement being effected by one or any combination of hydraulic cylinder, electric motor or other actuation means.

Preferably, the article handling apparatus further includes a control means to control movement of said base frame over said substrate surface and said gripping and moving of said article.

Preferably, said control means is located proximal to or formed integrally with said central body portion of said apparatus and/or on at least one of said arms of said base frame.

Most preferably, said apparatus is capable of being compactly stored.

Preferably, said article is a tire or other component of a vehicle earthmoving or mining equipment.

BRIEF DESCRIPTION OF THE DRAWINGS

The present invention will become more fully understood from the following detailed description of preferred but non-limiting embodiments thereof, described in connection with the accompanying drawings wherein:

FIG. 5 shows an isometric view of the article handling apparatus, but without the article in position;

FIG. 6 shows an isometric view of the article handling apparatus, again without the article, but in a compact position for storage;

DETAILED DESCRIPTION OF THE PREFERRED EMBODIMENTS

Figure 1:
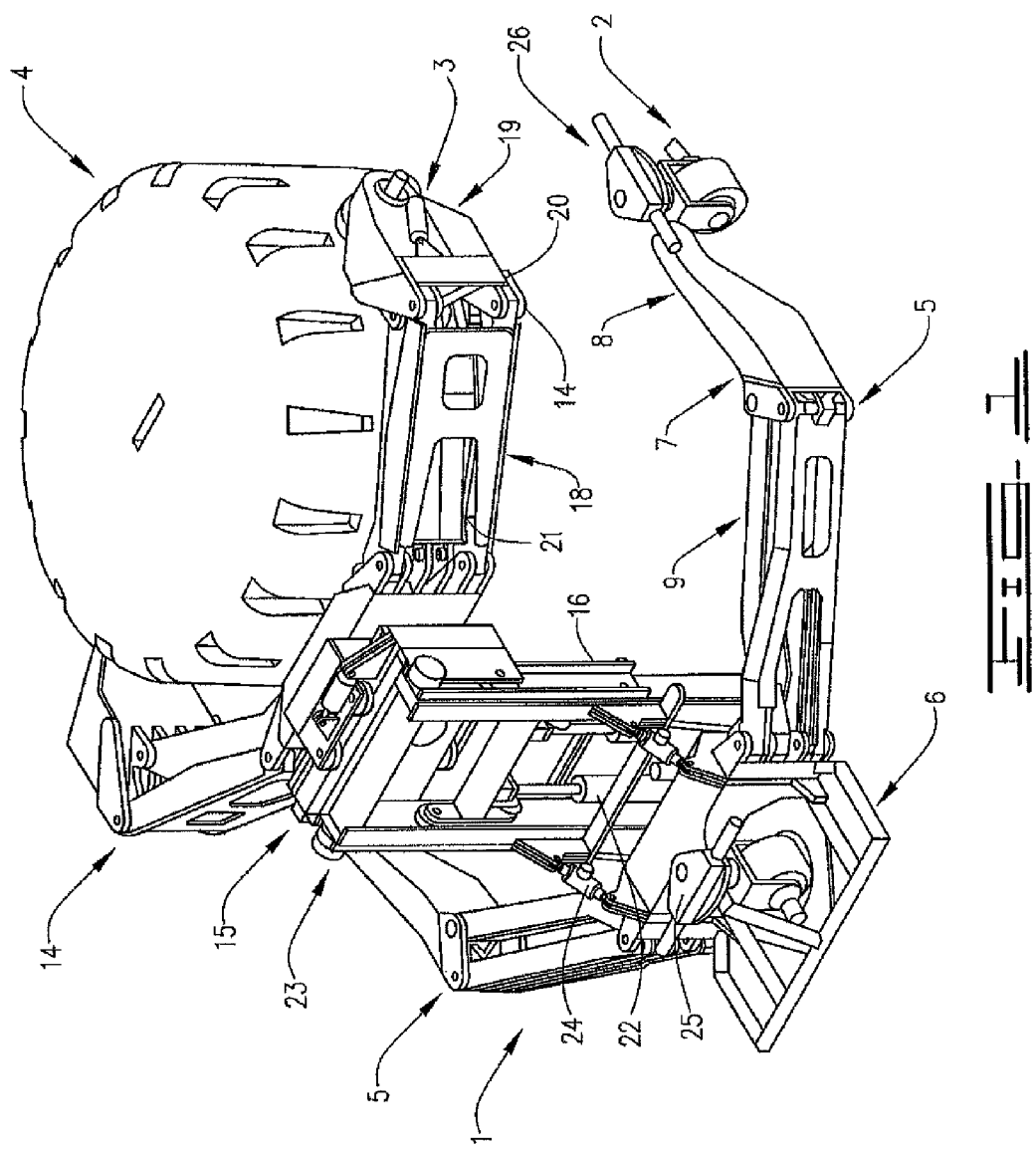
FIG. 1 illustrates an isometric view of an article handling apparatus in accordance with the present invention.
Figure 2:
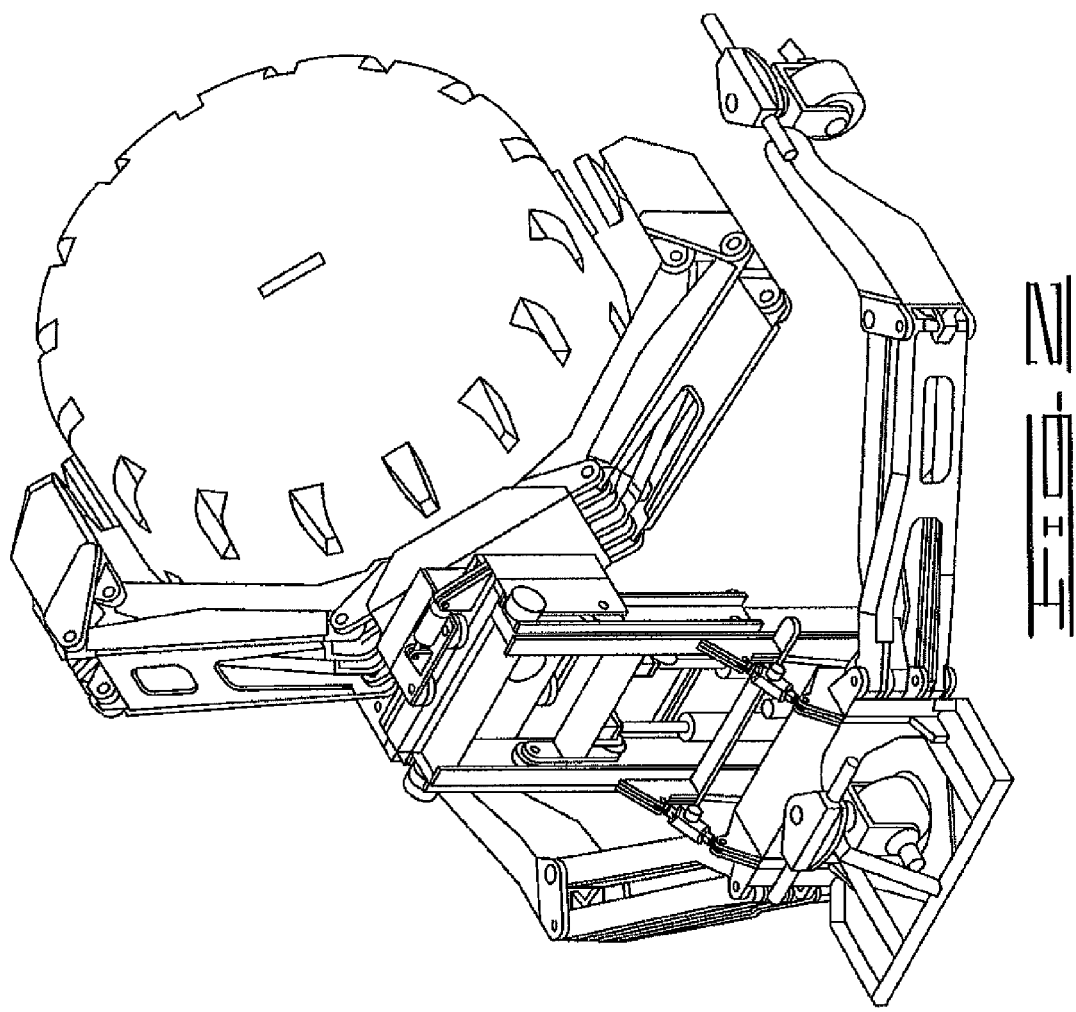
FIG. 2 illustrates another isometric view of the article handling apparatus, with the article provided in an alternative disposition to that of FIG. 1.
Figure 3:
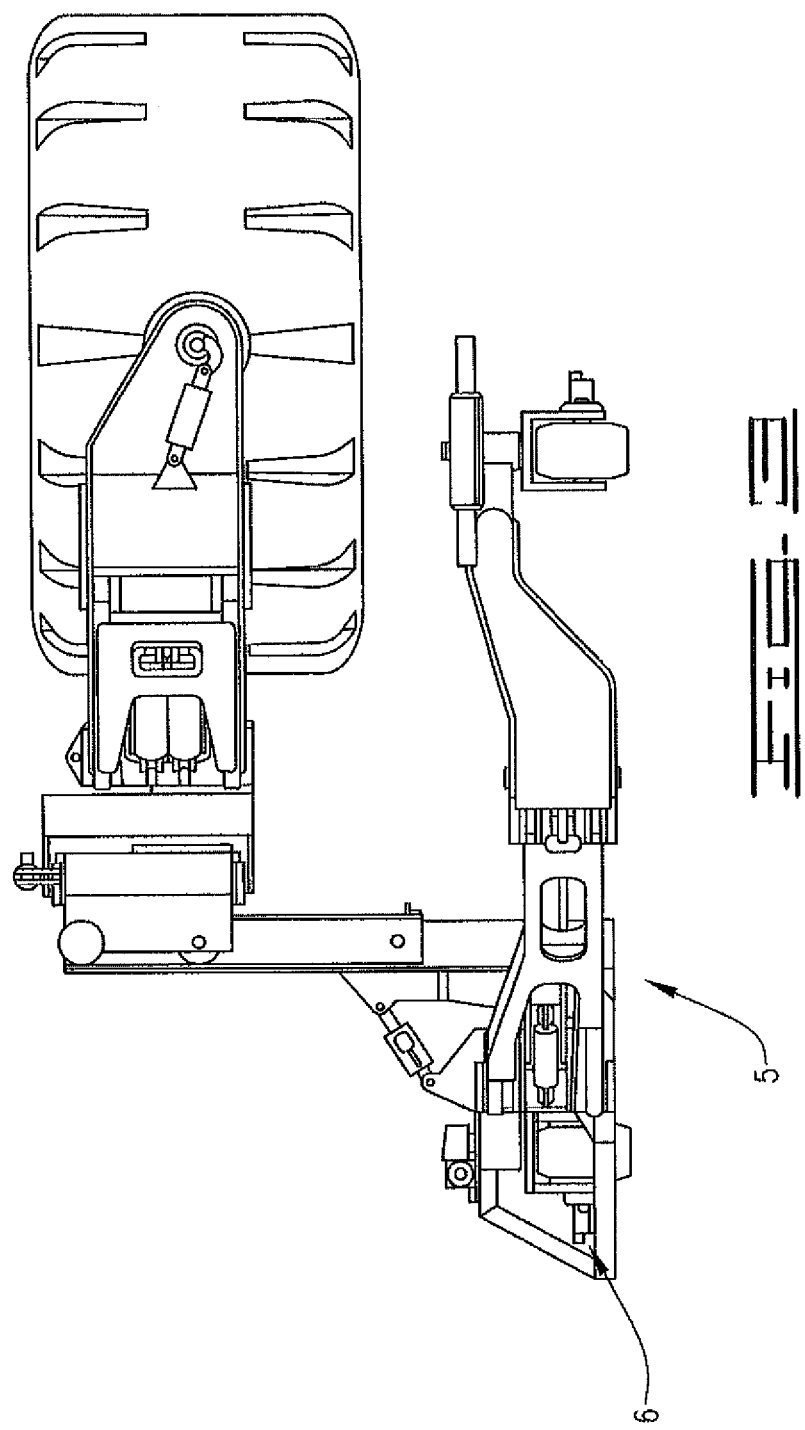
FIG. 3 shows an elevational view of the apparatus in the position shown FIG. 1.
Figure 4:
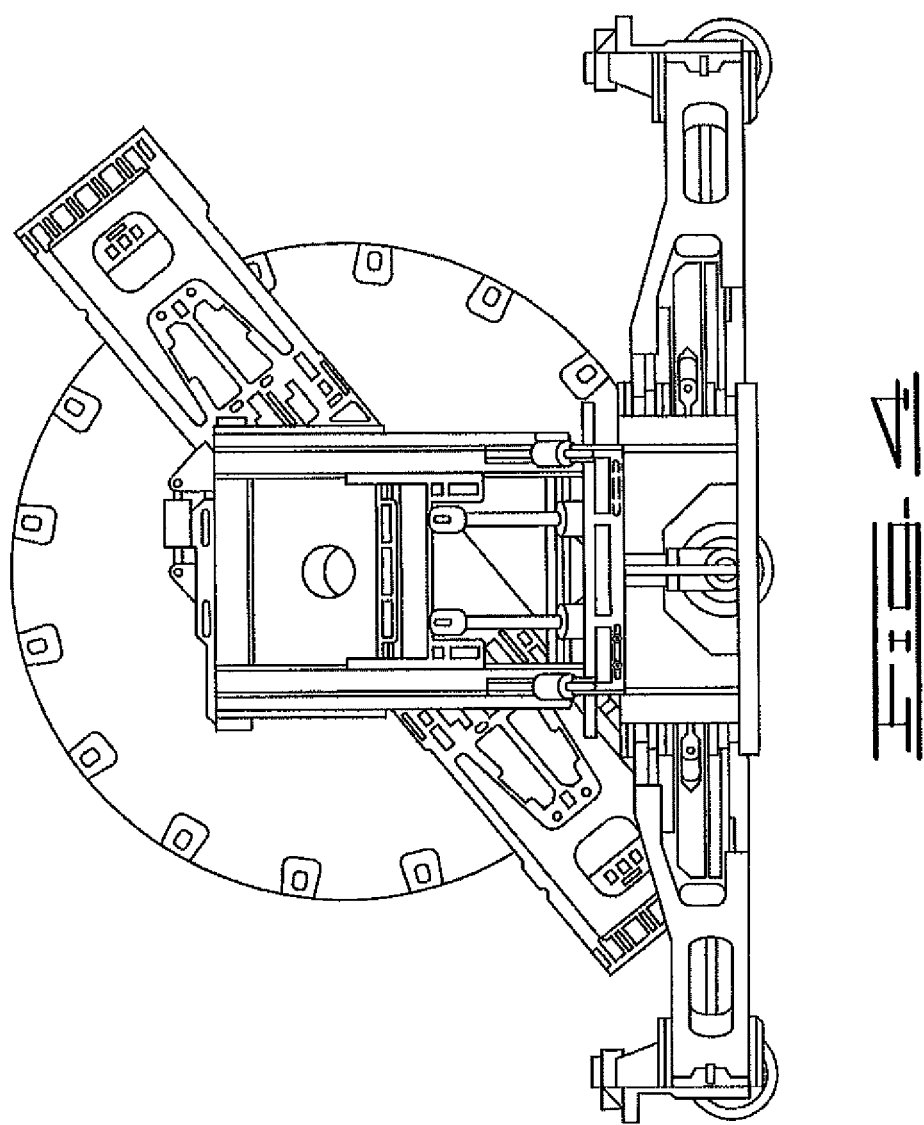
FIG. 4 shows an elevational view of the apparatus in the position shown in FIG. 2.
Figure 11:
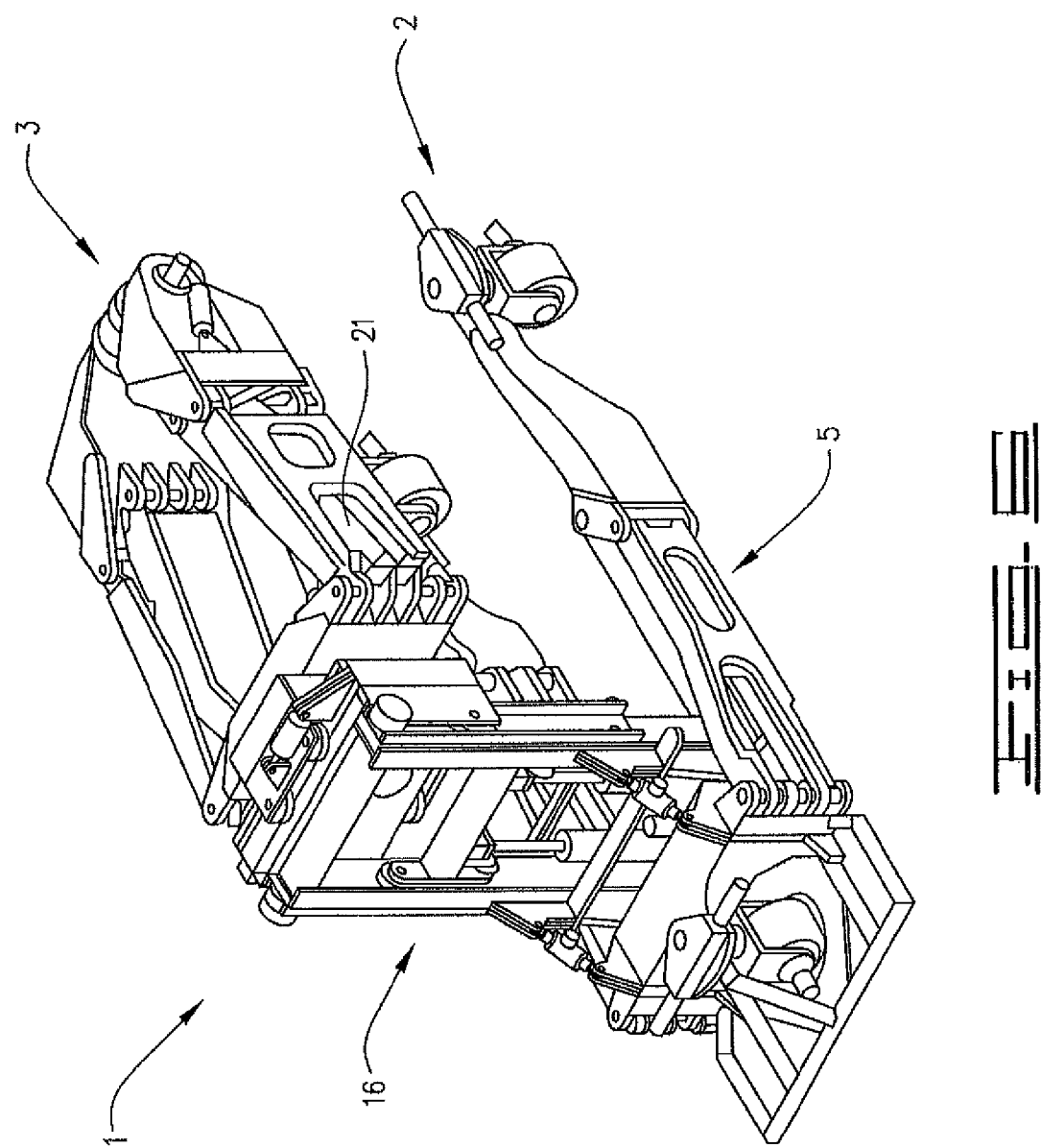
Figure 7:
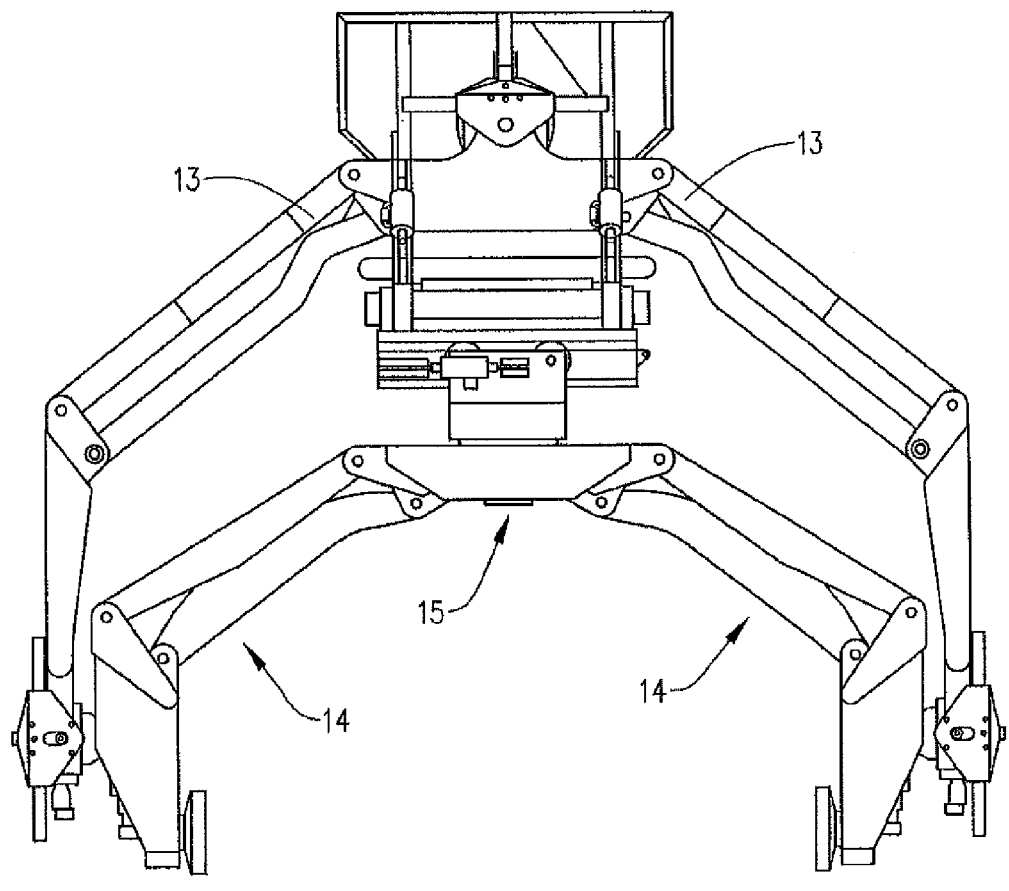
FIG. 7 shows a plan view of the article handling apparatus shown in FIG. 5.

Throughout the drawings, like numerals will be used to identify similar features, except where expressly otherwise indicated.

As shown in the drawings, the article handling apparatus, generally designated by the numeral 1, includes a base frame portion, generally designated by the numeral 2, for movement of the apparatus 1 over a substrate surface, and a handling frame, generally designated by the numeral 3, for gripping and moving an article, such as a tire 4, shown in FIGS. 1 to 4.

As seen in the drawings, the base frame 2 includes a pair of moveable arm members 5 extending from a central body portion 6. Most preferably, but not essentially, each of the arms 5 is articulated about articulation point 7. The illustrated embodiment shows two arm portions 8 and 9 forming each arm 5, the arm portions 8 and 9 being articulated about an articulation point 7. Any number of articulated arm portions may be provided.

The base frame 2 includes wheels or other movement means for movement of the base frame and therefore the article handling apparatus over a substrate surface. The illustrated embodiment shows three wheel sets on the base frame 2, indicated by reference numerals 10, 11 and 12. Obviously, additionally wheels could be provided depending upon the particular embodiment. The provision of the wheels on the extremities of the arms and on the central body portion, as illustrated in the embodiment herein described, provides good balance to the apparatus, as will be clearly understood to persons skilled in the art. Articulation of the arm members may be effected by any known form of actuation means, such as hydraulic cylinders, electric motors, or any combination thereof. The illustrated embodiment shows hydraulic cylinders 13 provided between the members forming arm 9. Obviously the location of actuation means is variable as will be clearly understood by a person skilled in the art.

The handling frame 3 of the article handling apparatus 1 is also formed of a pair of arm members 14 extending from a central portion 15. The central body portion 15 of the handling frame 3 may either be separate from or formed integrally with the central body portion 6 of the base frame 2. That is, whereas the handling frame 3 is shown in the illustrated embodiment as being upwardly disposed from the base frame 2, and separated by a vertical framework 16, the handling framework could alternatively extend from the central body portion 6 of the base frame 2 and this could be embodied in a more arcuate or curved fashion, rather than the more rigid or angular manner shown in the illustrated embodiment. Likewise, the handling frame 3 may be attached to the central portion 15 via a sliding mechanism 29, such as shown in FIG. 9, to enable further movement, particularly in difficult to reach positions.

The ends of each arm 14 of the handling frame 3 are shown to include a gripping means 17, for gripping the tire or other article to be handled. The gripping means illustrated in the drawings is embodied as a pair of pate plate members, whereby the tire or other article is gripped by being pressed between the plates 17. As will be understood by persons in the art, the plates 17 are movable about a universal type joint, to allow orientation of the plates 17 depending upon the shape of the article, in any direction. Some of the typical movements capable are illustrated by comparing FIGS. 1 and 2 of the drawings. It will be understood that the tire can be extended about an axis extending between the plates 17 by a full rotation of 360° while likewise the plates 17 may be offset from their pivot points to grip an article of any desired shape or construction.

The gripping means 17 may be moved by any conventional means, for instance by an electric motor, by a pneumatic or hydraulic cylinders, or any other form of actuation means known to persons skilled in the art. Likewise, the arms 14, which are also shown in the drawings to be formed of two members 18 and 19 connected about articulation points 20, may also be moved by any known form of actuation means such as hydraulic cylinders, electric motors, etc. The actuation means for effecting articulated movement of the arm members 14 illustrated in the drawings are in the form of hydraulic cylinders 21.

The handling frame 3 is also shown in the drawings to include a substantially vertically extendable central body portion 16 which basically interconnects it to the base frame 2. It will be appreciated by a person skilled in the art that the operation of the central body portion 16 is somewhat analogous to the movements effected by a fork-lift apparatus in that it is able to be moved in a substantially vertical manner, by virtue of an appropriate actuation apparatus, such as electric motors or hydraulic cylinders. The embodiment illustrated shows a pair of hydraulic cylinders 22 to effect such movement. The central body portion 16 shown in the illustrated embodiment also shows the capability of a pivotal connection 23 at the upper end of the central body portion, and a pivotal movement capability between the base frame 2 and the central body portion of a handling frame 3, by virtue of a pivotal connection operable by hydraulic cylinders 24.

It will therefore be appreciated that a variety of movements are capable of being performed by the article handling apparatus shown in the drawings. It will further be understood by a person skilled in the art that the movement capabilities are widely variable.

In order to control the operation of the apparatus handling apparatus, this may be effected by means of a remote control device, or by one or more control means built integrally to the device. The device shown in the drawings shows control means, to control movement of the base frame over the substrate surface, together with movement of the handling frame to effect gripping and movement of the article, by virtue of a controller 25, provided adjacent the central body portion 6, and also by additional controllers 26 and 27 shown adjacent the wheels 11 and 12 respectively at the ends of the arms 5 of the base frame 2. While the controller 25 is shown in the drawings being somewhat displaced from the central body portion by arm 28, such displacement need not be necessary, and, in situations where the length of the article handling apparatus is critical, may be reduced or eliminated.

Figure 8:
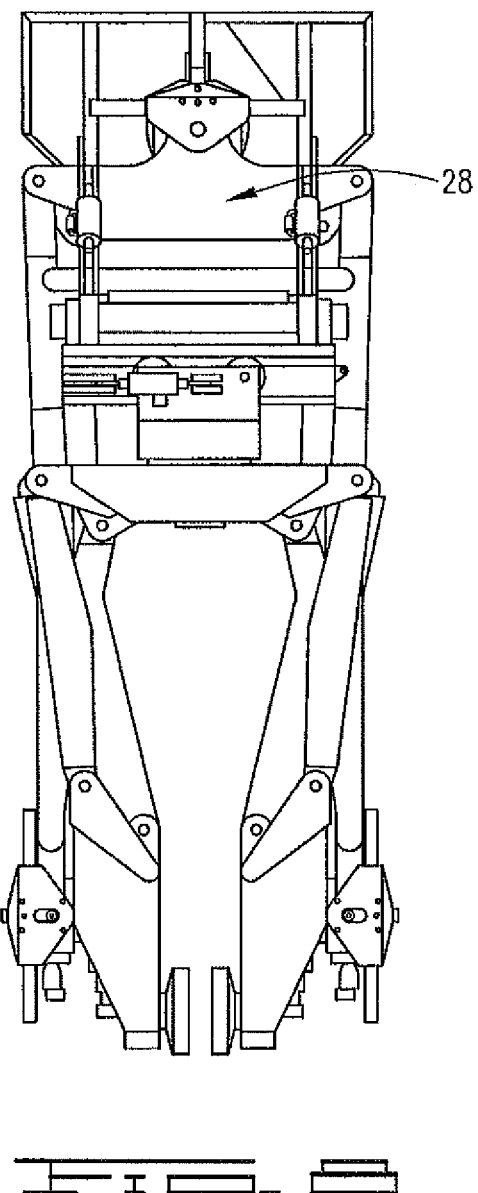
FIG. 8 shows a plan view of the article handling apparatus shown in FIG. 6; and, FIG. 9 shows an isometric view of the article handling apparatus, incorporating a sliding mechanism.

As perhaps illustrated in FIGS. 6 and 8, the article handling apparatus of the present invention is able to be very compactly stored by appropriate contraction of the arms towards the central point of the article. Likewise, it will be appreciated that, due to the unique design of the article, the article handling apparatus of the present invention is capable of being manipulated through tight spaces, and the base frame is capable of being provided under vehicles having relatively little height from the substrate surface, to perform a wide variety of manipulating tasks.

While the present invention has been hereinbefore described as being particularly appropriate for handling tires of large earthmoving or mining equipment, primarily because the large size and otherwise awkwardness of handling such components, the article handling apparatus of the present invention will be understood to be able to be easily adapted for handling tires or wheels of any dimensions, and in fact, for handling articles of a wide variety of shapes and sizes.

While the illustrated embodiment shows particular details of such an article handling apparatus, it will be very clearly understood by a person skilled in the art that a wide variety of variations and modifications will become apparent to persons skilled in the art. All such variations and modifications should be considered to fall within the scope of the invention as broadly hereinbefore described and as hereinafter claimed.

What is claimed is:

1. An article handling apparatus comprising:
    a base frame, said base frame including:
        a base frame central body portion;
        a pair of arms extending from said base frame central body portion, wherein each arm has a pivotal attachment securing said arm to said base frame central body portion and each arm has at least one articulation point wherein cooperation of said pivotal attachment and said articulation point permits alignment of each arm ninety degrees relative to said base frame central body portion with both arms parallel to one another;
        at least three wheels, with at least one wheel position at the end of each base frame arm and one wheel positioned on said base frame central body portion;
    a handling frame, said handling frame including:
        a handling frame central body portion;
        a pair of arms extending from said handling frame central body portion, wherein each arm has a pivotal attachment securing said arm to said handling frame central body portion and each arm has at least one articulation point wherein cooperation of said pivotal attachment and said articulation points permit alignment of each arm ninety degrees relative to said handling frame central body portion and wherein both arms are parallel to one another;
        a single gripping means carried by the terminal end of each arm extending from said handling frame central body portion; and,
    a vertically extendable portion including at least one hydraulic cylinder positioned to adjust the vertical height of said vertically extendable portion,
    a first pivotal connection between said base frame central body portion and said vertically extendable portion, said first pivotal connection including a pair of hydraulic actuators; and
    a second pivotal connection between said handling frame central body portion and said vertically extendable portion.

2. The apparatus of claim 1, wherein said gripping means is secured to the terminal end of said arm by a universal joint.

3. An article handling apparatus as claimed in claim 1, wherein said gripping means includes a pair of plates, each plate secured to the terminal end of said arm by a universal joint, whereby said article is gripped by being pressed between said plates.

4. An article handling apparatus as claimed in claim 3, wherein said plates are rotatable to allow orientation of said article in any direction.

5. An article handling apparatus as claimed in claim 1, wherein said handling frame arms are configured to move from a first expanded position to a second position wherein when in said second position said handling frame arms are ninety degrees relative to said handling frame central body portion and wherein both arms are parallel to one another.

6. An article handling apparatus as claimed in claim 1, wherein said base frame arms are configured to move from a first expanded position to a second position wherein when in said second position said base frame arms are ninety degrees relative to said base frame central body portion and wherein both arms are parallel to one another.

* * * * *